(12) United States Patent
Hassanzadeh et al.

(10) Patent No.: US 11,074,266 B2
(45) Date of Patent: Jul. 27, 2021

(54) SEMANTIC CONCEPT DISCOVERY OVER EVENT DATABASES

(71) Applicant: International Business Machines Corporation, Armonk, NY (US)

(72) Inventors: Oktie Hassanzadeh, Yorktown Heights, NY (US); Sharon Mary Trewin, Yorktown Heights, NY (US); Alfio Massimiliano Gliozzo, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 132 days.

(21) Appl. No.: 16/157,304

(22) Filed: Oct. 11, 2018

(65) Prior Publication Data

US 2020/0117738 A1   Apr. 16, 2020

(51) Int. Cl.
*G06F 17/27* (2006.01)
*G06F 16/2458* (2019.01)
(Continued)

(52) U.S. Cl.
CPC .... *G06F 16/2465* (2019.01); *G06F 16/24522* (2019.01); *G06F 16/24578* (2019.01);
(Continued)

(58) Field of Classification Search
CPC .. G06F 40/279; G06F 40/30; G06F 16/24522; G06F 16/2465; G06F 17/30;
(Continued)

(56) References Cited

U.S. PATENT DOCUMENTS

| 6,847,966 B1* | 1/2005 | Sommer | G06F 16/3347 |
| | | | 707/739 |
| 7,827,125 B1* | 11/2010 | Rennison | G06F 16/319 |
| | | | 706/14 |

(Continued)

FOREIGN PATENT DOCUMENTS

EP     3057008 A1    8/2016

OTHER PUBLICATIONS

Mel, et al. "The NIST Definition of Cloud Computing". Recommendations of the National Institute of Standards and Technology, Nov. 16, 2015.

(Continued)

*Primary Examiner* — Hicham Skhoun
(74) *Attorney, Agent, or Firm* — Anthony Curro, Esq.; McGinn I.P. Law Group, PLLC.

(57) ABSTRACT

A concept discovery method, system, and computer program product include preparing a concept index for concepts built over a set of input data having input terms, building a vector representation of the concepts in the input data, receiving a set of query terms as an additional input, mapping the set of query terms to the concepts in the concept index, calculating at least one of a co-occurrence score for each of the concepts in the concept index by measuring their frequency of co-occurrence with the input terms' concepts and a similarity score for each of the concepts in the concept index by measuring the similarity of their vector representations according to a vector similarity measure, and ranking the concepts with respect to their relevance to the input terms by the at least one of the co-occurrence score and the similarity score.

13 Claims, 7 Drawing Sheets

(51) Int. Cl.
  *G06K 9/46* (2006.01)
  *G06F 16/2452* (2019.01)
  *G06F 16/2457* (2019.01)
  *G06F 40/30* (2020.01)
  *G06F 40/279* (2020.01)

(52) U.S. Cl.
  CPC ............ *G06F 40/279* (2020.01); *G06F 40/30* (2020.01); *G06K 9/46* (2013.01); *G06K 2209/01* (2013.01)

(58) Field of Classification Search
  CPC .. G06F 17/27; G06F 16/24578; G06F 16/245; G06K 9/46; G06K 2209/01; G06K 9/325
  USPC .......................................................... 707/741
  See application file for complete search history.

(56) References Cited

U.S. PATENT DOCUMENTS

| | | | | |
|---|---|---|---|---|
| 7,975,003 | B1* | 7/2011 | Lee | G06Q 20/12 709/203 |
| 8,463,810 | B1 | 6/2013 | Rennison | |
| 8,600,922 | B2* | 12/2013 | Adriaansen | G06T 11/001 706/46 |
| 9,116,995 | B2* | 8/2015 | Koperski | G06F 16/285 |
| 9,146,986 | B2 | 9/2015 | Dunn et al. | |
| 9,336,192 | B1* | 5/2016 | Barba | G06F 40/30 |
| 9,348,920 | B1* | 5/2016 | Kesin | G06F 16/367 |
| 9,646,248 | B1 | 5/2017 | Benvenuto et al. | |
| 9,672,279 | B1* | 6/2017 | Cohen | G06F 16/358 |
| 9,773,054 | B2 | 9/2017 | Franceschini et al. | |
| 9,836,538 | B2* | 12/2017 | Rappaport | G06F 16/951 |
| 9,898,528 | B2* | 2/2018 | Kesin | G06F 16/9535 |
| 2007/0271224 | A1* | 11/2007 | Essafi | G06F 16/41 |
| 2008/0281915 | A1* | 11/2008 | Elad | G06Q 30/02 709/204 |
| 2009/0226872 | A1* | 9/2009 | Gunther | G09B 7/00 434/350 |
| 2010/0262454 | A1* | 10/2010 | Sommer | G06Q 30/02 706/20 |
| 2011/0087670 | A1 | 4/2011 | Jorstad et al. | |
| 2011/0119269 | A1 | 5/2011 | Agrawal et al. | |
| 2011/0179026 | A1 | 7/2011 | Mulligen et al. | |
| 2013/0021346 | A1* | 1/2013 | Terman | G09B 5/08 345/467 |
| 2013/0110861 | A1* | 5/2013 | Roy | G06F 16/3329 707/765 |
| 2014/0067832 | A1* | 3/2014 | Lamba | G06F 16/367 707/750 |
| 2014/0279773 | A1 | 9/2014 | Chen et al. | |
| 2015/0235143 | A1* | 8/2015 | Eder | G06F 19/00 706/12 |
| 2016/0179945 | A1* | 6/2016 | Lastra Diaz | G06F 16/3334 707/739 |
| 2017/0039468 | A1 | 2/2017 | Zeiler | |
| 2017/0228361 | A1* | 8/2017 | Zhang | G06F 16/337 |
| 2017/0228654 | A1* | 8/2017 | Skupin | G06F 40/103 |
| 2017/0286835 | A1 | 10/2017 | Ho et al. | |
| 2019/0108286 | A1* | 4/2019 | Pan | G06F 40/295 |
| 2019/0392330 | A1* | 12/2019 | Martineau | G06F 16/9024 |
| 2020/0098161 | A1* | 3/2020 | Smith | G06T 15/005 |

OTHER PUBLICATIONS

Hassanzadeh et al.; "Semantic Concept Disocvery Over Event Databases", European Semantic Web Conference On, Feb. 14, 2018, pp. 1-15.

Chen et al.; "Event-Driven Semantic Concept Discovery By Exploiting Weakly Tagged Internet Images", ICMR'14 ACM International Conference On, Apr. 1-4, 2014, pp. 1-8.

Shaw et al.; "A Case Study Of Utilizing Concept Knowledge In A Topic Specific Document Collection", 12th AusDM Conference On, Nov. 27-28, 2014, pp. 149-156.

Termehchy et al.; "Which Concepts Are Worth Extracting?", SIGMOD'14 ACM SIGMOD International Conference On, Jun. 22-27, 2014, pp. 779-790.

* cited by examiner

FIG. 4

| Ground truth | co-occur | context | co-occur_context | context_co-occur |
|---|---|---|---|---|
| Nicolás Maduro (*) | Nicolás Maduro | Delcy Rodriguez | Delcy Rodriguez | Nicolás Maduro |
| Hugo Chávez (*) | Barack Obama | Nicholás Maduro | Nicholás Maduro | Juan Manuel Santos |
| Zeid Ra'ad Al Hussein (*) | Rafael Correa | Jesus Torrealba | Hannah Dreier | Hannah Dreier |
| Ban Ki-moon | Hugo Chávez | Vladimir Padrino | Luis Almagro | Luis Almagro |
| Delcy Rodriguez (*) | Joshua Goodman | Henrique Capriles | Juan Manuel Santos | Delcy Rodriguez |
| Luisana Melo (*) | John Kerry | Nicolás Maduro | Barack Obama | Nicholás Maduro |
| Luis Almagro (*) | Bashar Assad | Jorge Arreaza | Rafael Correa | Jesus Torrealba |
| Johan Gabriel Pinto Graterol | Donald Trump | Hannah Dreier | Hugo Chávez | Vladimir Padrino |
| Julio León Heredia | Juan Manuel Santos | Girish Gupta | Joshua Goodman | Henrique Capriles |
| Carlos Zapa | Gonzalo Solano | Eyanir Chinea | John Kerry | Jorge Arreaza |
| Flor Sanchez | Vladimir Putin | Andrew Cawthorne | Bashar Assad | Girish Gupta |
| Diosdado Cabello (*) | David Granger | David Smilde | Donald Trump | Eyanir Chinea |
| Rafael Uzcategui | John Kirby | Ernesto Villegas | Gonzalo Solano | Andrew Cawthorne |
| Feliciano Reyna | Salva Kiir | Luis Almagro | Vladimir Putin | David Smilde |

SEMANTIC CONCEPT DISCOVERY OVER EVENT DATABASES

STATEMENT REGARDING FEDERALLY SPONSORED RESEARCH OR DEVELOPMENT

This invention was made with Government support under contract number 2013-12101100008 awarded by the Department of Defense. The Government has certain rights to this invention.

BACKGROUND

The present invention relates generally to a concept discovery method, and more particularly, but not by way of limitation, to a system, method, and computer program product for a cognitive agent that assists with discovery of the most relevant entities and concepts given a topic (e.g., set of keywords or a natural language description of the key analysis question).

Analysts are often tasked with preparing a comprehensive, accurate, and unbiased report on a given topic. The first step in preparing such a report is a daunting discovery task that requires researching through a massive amount of information. Information sources can have large volume, variety, varying veracity, and velocity—the common characteristics of the so-called "Big Data" sources.

Many times the analysis requires a deep understanding of various kinds of historical and ongoing events that are reported in the media. To enable better analysis of events, there exist several event databases containing structured representations of events extracted from news articles. Examples include GDELT, ICEWS, and EventRegistry. These event databases conventionally have been successfully used to perform various kinds of analysis tasks, e.g., forecasting societal events. However, there has been little work on the discovery aspect of the analysis.

Conventional discovery systems rely on text data and mining of textual data available in news articles and online social media. This results in an isolated discovery phase, the results of which cannot effectively be used in the remaining analysis steps. Furthermore, the noise in the text data and the difficulty of extracting knowledge from text can blur the overall view of the relevant pieces of information and result in incomplete or inaccurate coverage in the outcome.

Therefore, there is a need in the art to fill a gap between the information requirements and the available data, and potentially a biased view of the available information.

SUMMARY

In an exemplary embodiment, the present invention provides a method for preparing a concept index for concepts built over a set of input data, building a vector representation of the concepts in the input data, receiving a set of query terms as an additional input, mapping the set of query terms to the concepts in the concept index, calculating at least one of a co-occurrence score for each of the concept in a concept index by measuring their frequency of co-occurrence with the input terms' concepts and a similarity score for each of the concepts in the concept index by measuring the similarity of their vector representations according to a vector similarity measure, and ranking the concepts with respect to their relevance to the input terms by the at least one of the co-occurrence score and the similarity score. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 4 exemplarily depicts an example of how re-rankings improve the results;

DETAILED DESCRIPTION

Figure 1:
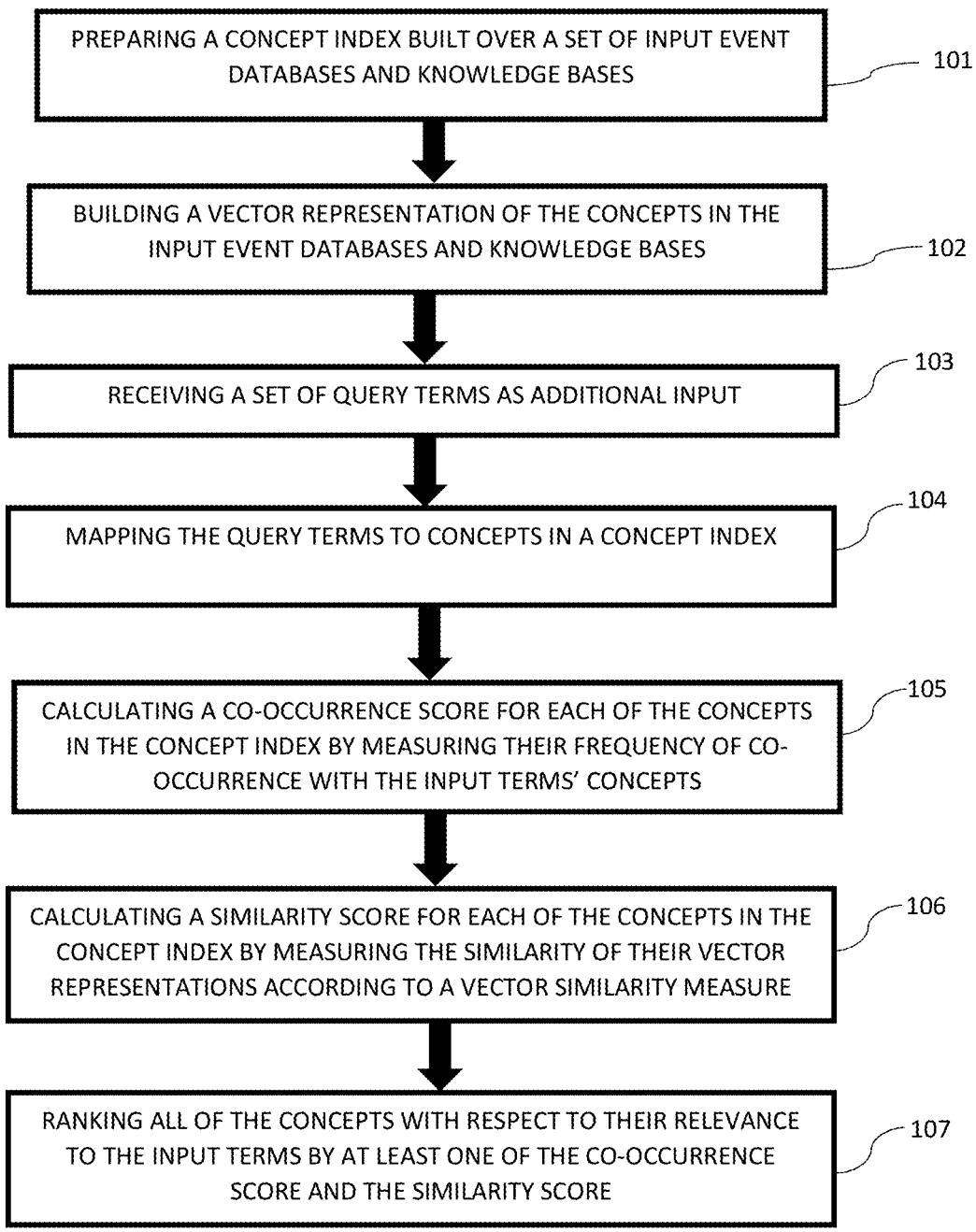
FIG. 1 exemplarily shows a high-level flow chart for a concept discovery method 100 according to an embodiment of the present invention.

The invention will now be described with reference to FIGS. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, an embodiment of a concept discovery method 100 according to the present invention can include various steps for, Given a question (e.g., set of entities and concepts), finding the most relevant entities and concepts needed to generate a high-quality intelligence analysis report.

Thus, the invention can provide an analyst with a cognitive agent that assists with discovery of the most relevant entities and concepts given a topic.

Figure 5:
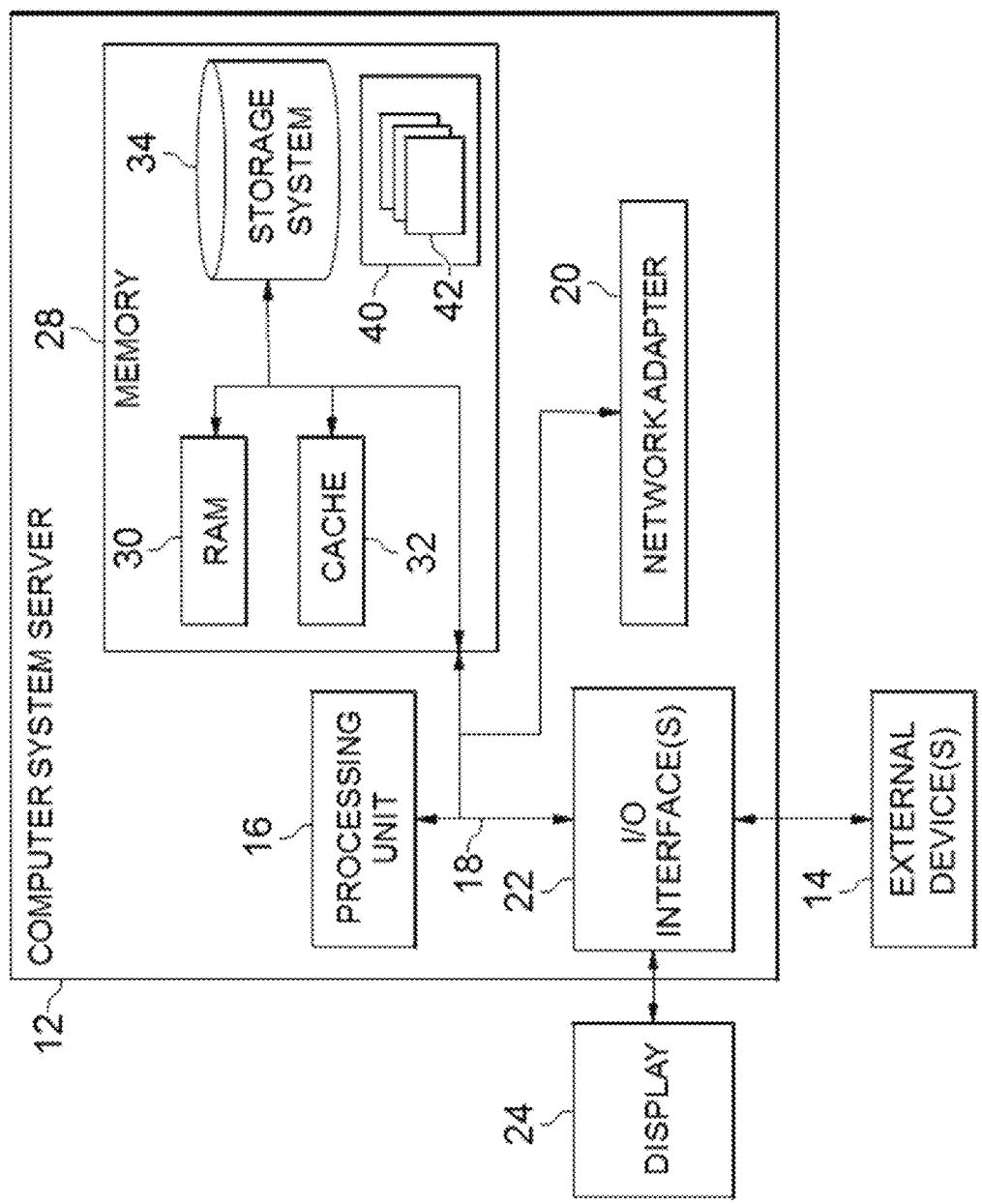
FIG. 5 depicts a cloud-computing node 10 according to an embodiment of the present invention.

By way of introduction of the example depicted in FIG. 5, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 7), it is nonetheless understood that the present invention can be implemented outside of the cloud environment.

Referring to FIG. 1, in step 101, a concept index built over a set of, for example, input event databases and knowledge bases, is prepared. Event databases are structured records describing various kinds of societal, political, or economic events. While event extraction from text is a well-studied topic with a dedicated track at the annual Text Analysis Conference, there are only a few publicly available large-scale event databases. The input of these event databases is a large corpus of news articles that are either gathered from various news sources (e.g., news agencies and other proprietary sources) or crawled from the Web. The output is structured records (i.e., relational data tables) describing various features of the identified events. For example, the Global Data on Events, Location, and Tone (GDELT) project, Integrated Conflict Early Warning System (ICEWS) that provides a coded event database similar to the GDELT Events database, the EventRegistry project, and ingested publicly available RDF knowledge bases to use as a source of reference knowledge such as Wikidata®, DBpedia®, YAGO®, and Freebase® can be used as the input event databases and knowledge bases.

Figure 2:
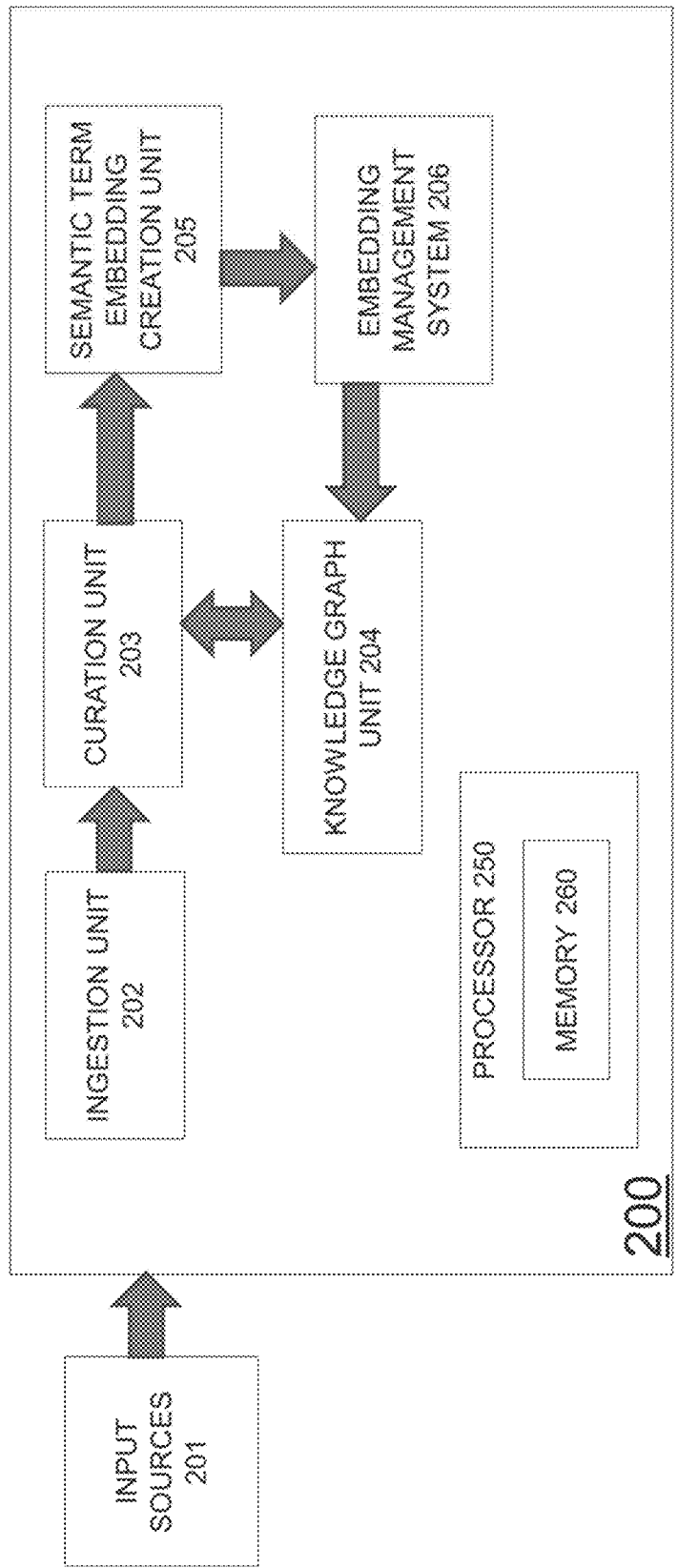
FIG. 2 exemplarily depicts a system architecture for the method 100 according to an embodiment of the present invention.

Referring generally to the system architecture of FIG. 2, the input event databases and knowledge bases correspond to the input sources 201.

It is noted that the input sources 201 can be prepared entirely by the invention instead of working on top of existing database. The inputs can be prepared by, for example, a common ingestion pipeline (e.g., an ingestion unit 202) for both the event databases and knowledge sources that is capable of crawling remote sources, parsing structured relational, semi-structured (JSON), and RDF (NTriples) data, cleaning invalid records or statements and applying basic filters (e.g., removing non-English labels), and finally storing the data. The platform is implemented on top of Apache Hadoop® and Spark®, enabling efficient data processing on a cluster on a public or private cloud.

The invention can adopt a "pay-as-you-go" integration approach and perform only a minimal curation by a lightweight mapping of known entities and linking them using a common Uniform Resource Indicator (URI) when possible (e.g., controlled by the curation unit 203). As for the knowledge sources, the integration point is using the existing Wikipedia® URLs given that all our sources are based originally on Wikipedia®. One then can index all the facts (RDF triples) in a key-value store in addition to a document store that makes it possible to perform highly efficient fact-based or label-based lookups. One can also create an auxiliary unified index of common entities using a mapping strategy that results in a collection of 16,108,676 entities with Wikipedia® URLs, each linked with one or more of their Wikidata®, DBpedia®, YAGO®, and Freebase® URIs. All the event databases are indexed in a similar way in the key-value and document stores, with labels matched and linked with a Wikipedia® URL when possible.

In step 102, a vector representation is built of the concepts in the input event databases and knowledge bases. That is, by the semantic term embedding creation unit 205 and embedding management system 206, every value in the input event databases can be transformed into an embedding vector using a variation of the continuous skip-gram model of the original word2vec. The first step in this process is a virtual document creation process, turning each row in the input database into a context in a corpus of text. This step is performed efficiently in MapReduce. One then can feed the text corpus into a word2vec model construction modified to take into account the different characteristics of structured data.

For example, the order of columns in structured databases is of little importance. While distance between two words in a text document makes them farther in terms of context, the first column in a database table is as relevant to the second column as to the last column. In text documents, typically a random-sized window of words is selected. The length of each database record is fixed and so there is no need for a random window size. Most importantly, while all words in a text corpus are treated in the same way and do not have specific roles, values in different columns in structured sources describe different (event) features and may need to be grouped and queried differently. There is often a need to search over (or query using) the terms from specific attributes (columns).

Once attribute values are mapped into low-dimensional vectors, aggregate vectors can represent individual records (articles or events), and similarity queries over the vectors can be used for concept discovery and analysis. These vectors represent the semantic context of every single value seen in the input data, enabling a powerful and extremely efficient method of performing similarity analysis over large amounts of data. As an example, the corpus size (number of words in the "virtual documents") for GDELT GKG is 23,901,358,498 while the size of the vocabulary (number of unique words) in the invention embedding is 2,829,213. Still, a key requirement is efficient similarity queries over the vectors with milliseconds running time to enable real-time analysis queries, as some analysis queries require several similarity queries each over millions of vectors. The invention may achieve this by using an Annoy library as the core of the embedding management system 206.

In step 103, a set of query terms is received as an additional input and, in step 104, the query terms are mapped to the concepts in the concept index. That is, the ingestion unit 202, the curation unit 203, the semantic term embedding creation unit 205, and the embedding management system 206 interface with the knowledge graph unit 204 in which the outcome of all the components is a set of APIs (Application Programming Interfaces) to perform knowledge graph and concept discovery queries via the knowledge graph unit 204.

Also, an image or video and extracting query terms can be received using techniques that could include optical character recognition (OCR), speech recognition, examination of captions, and machine recognition of objects and people, etc.

In particular, lookup APIs of the knowledge graph unit 204 provide access to the ingested and curated event data and knowledge. For example, one can perform search over knowledge base entity labels and subsequently retrieve human-readable facts as JSON objects. Using this API the user can retrieve info box-style information about each of the concepts. These APIs also enable queries across event databases (e.g., retrieve ICEWS, GDELT, and EventRegistry events in a given time range that is annotated with a particular concept).

Also, a natural language and keyword query understanding API can be implemented via the knowledge graph unit 204. This API can turn the user query into a set of knowledge base concepts and event database terms.

And, a concept discovery and ranking API can be implemented via the knowledge graph unit 204 for receiving and mapping the queries to concepts in the concept index. The concept discovery and ranking API can take a set of concepts or terms and return as output a ranked list of concepts of different types (e.g., persons, organizations, themes, etc.).

Steps 105-107 identify and rank a set of most relevant concepts of various types (e.g., persons or organizations) for a given set of concepts. The end goal of steps 105-107 is providing an output either directly to an analyst or to other components of a decision analysis system, in order to assist with writing a comprehensive and unbiased report on the input concepts based on historical and ongoing events.

Figure 3:
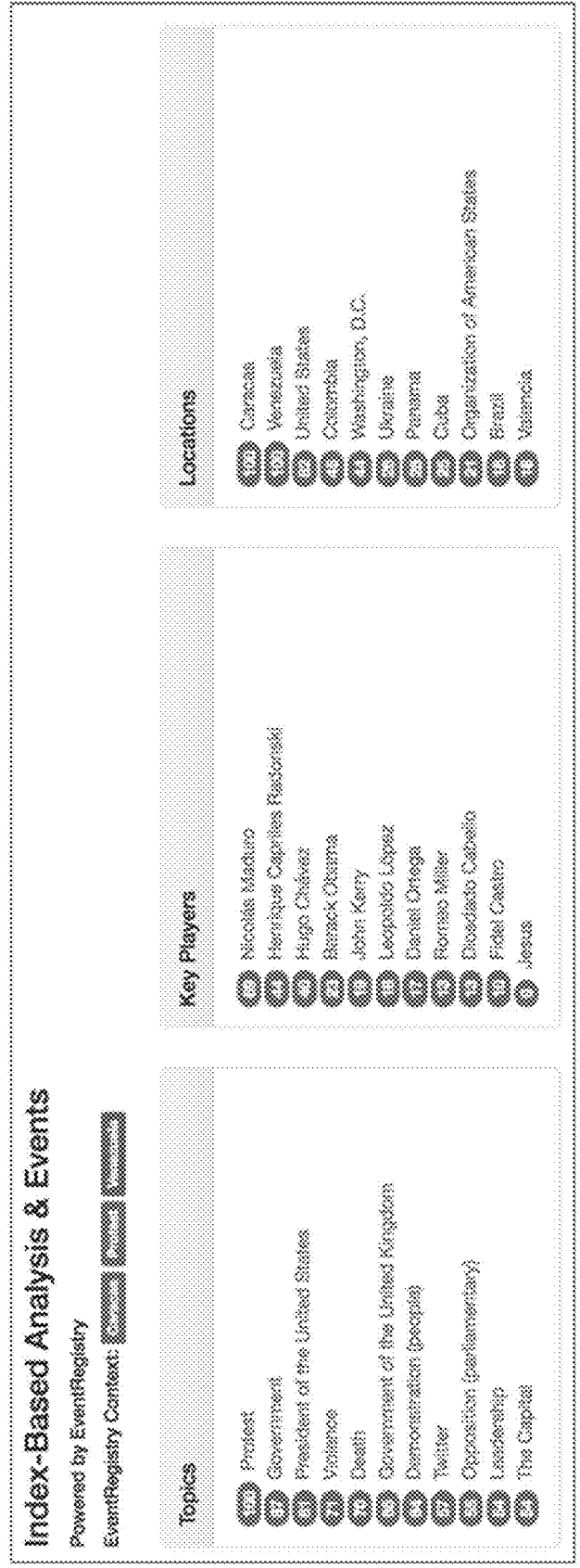
FIG. 3 exemplarily depicts an example of ranked concepts according to an embodiment of the present invention.

More specifically, in step 105, a co-occurrence score is calculated for each of the concept in a concept index by measuring their frequency of co-occurrence with the input terms' concepts. The calculation relies on an efficient index to measure the level of co-occurrence of concepts in a collection of events and uses this as a measure of relevance. Using the concept index prepared in step 101, one can search for (all or recent) event records annotated with a given set of concepts. By counting the concept annotations for every record in the output, a list of most frequently co-occurring concepts of various types is returned along with the percentage of co-occurrence of the annotations among all the retrieved event records. FIG. 3 shows an example of ranked "Topic", "Key Player" (Person), and "Location" concepts over EventRegistry event records where the API retrieves a maximum of 500 most recent events (an input parameter of the API). The concepts extracted from the input question are "Caracas", "Protest", and "Venezuela". Obviously, these concepts themselves are on top of the lists as they appear in 100% of the event records containing them. The topic concept "Government" appears in 87% of the events and "Nicolás Maduro" appears in 69% of the events, indicating that these concepts are highly relevant to the input concepts in recent events.

In step 106, a similarity score is calculated for each of the concepts in the concept index by measuring the similarity of their vector representations according to a vector similarity measure. Step 106 relies on the term embeddings built over an event database as described in step 102. First, a vector is retrieved for each of the terms extracted from the input question (where there exists a vector representation in the embed-dings space), and an average vector is constructed by summing the values in each dimension and normalizing the resulting vector. Using the embedding management system 206, the most similar vectors of various kinds of terms are retrieved, ranked by their similarity to the average vector. FIG. 3 shows an example of concept rankings with the same question. The API used in this example queries embedding built over GDELT GKG, with vectors of size 200 and cosine similarity as our choice of vector similarity measure. Unlike the index-based results in step 105, these rankings reflect the relevance according to the context of these terms in over 157 million GKG records, and result in less-obvious and harder-to-explain but deeply relevant sets of concepts in the output.

In step 107, all of the concepts are ranked with respect to their relevance to the input terms by, for example, at least one of the co-occurrence score and the similarity score. It is noted that the rank can be based only on the co-occurrence score or only on the similarity score. However, the results will be more optimal if a combination is used. Thus, the scores can be ranked individually or as a combination. That is, the co-occur technique has the disadvantage of requiring co-occurrence and high-quality concept annotations, and the context technique has the disadvantage of results that are hard to explain and often relevant but less important concepts than the co-occur technique. As a result, the ranking can combine the two techniques as a way of addressing each individual techniques limitation. In a first combination technique, one can retrieve a set of 3*k results of an index-based technique, re-rank the output using the embedding-based similarity of the terms in the output, then select the top k terms. In a second combination technique, 3*k results are retrieved of the context retrieval and sort the output based on their position in the co-occur results before selecting the top k terms. FIG. 4 shows an example of how these re-rankings improve the results.

Therefore, unlike existing concept discovery solutions that perform discovery over text documents and in isolation from the remaining data analysis tasks, the invention can provide a unified solution that allows deep understanding of the same data that will be used to perform other analysis tasks (e.g., hypothesis generation, or building models for forecasting). The invention also has the advantage of relying on a high-quality structured event database that, unlike textual sources of information, contains less noise, provide a more accurate, and detailed description of the events.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 5, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 6:
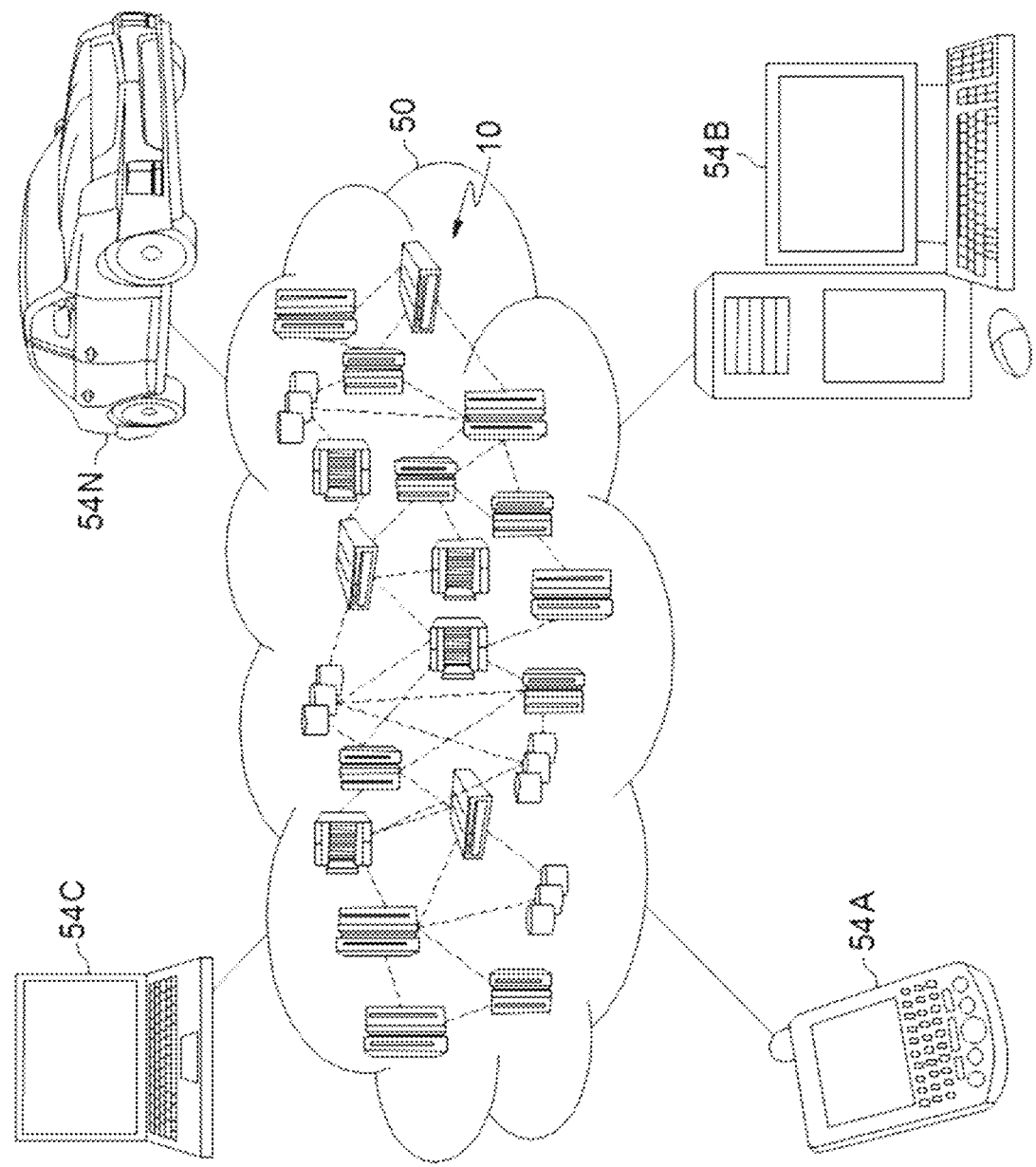
FIG. 6 depicts a cloud-computing environment 50 according to an embodiment of the present invention.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Figure 7:
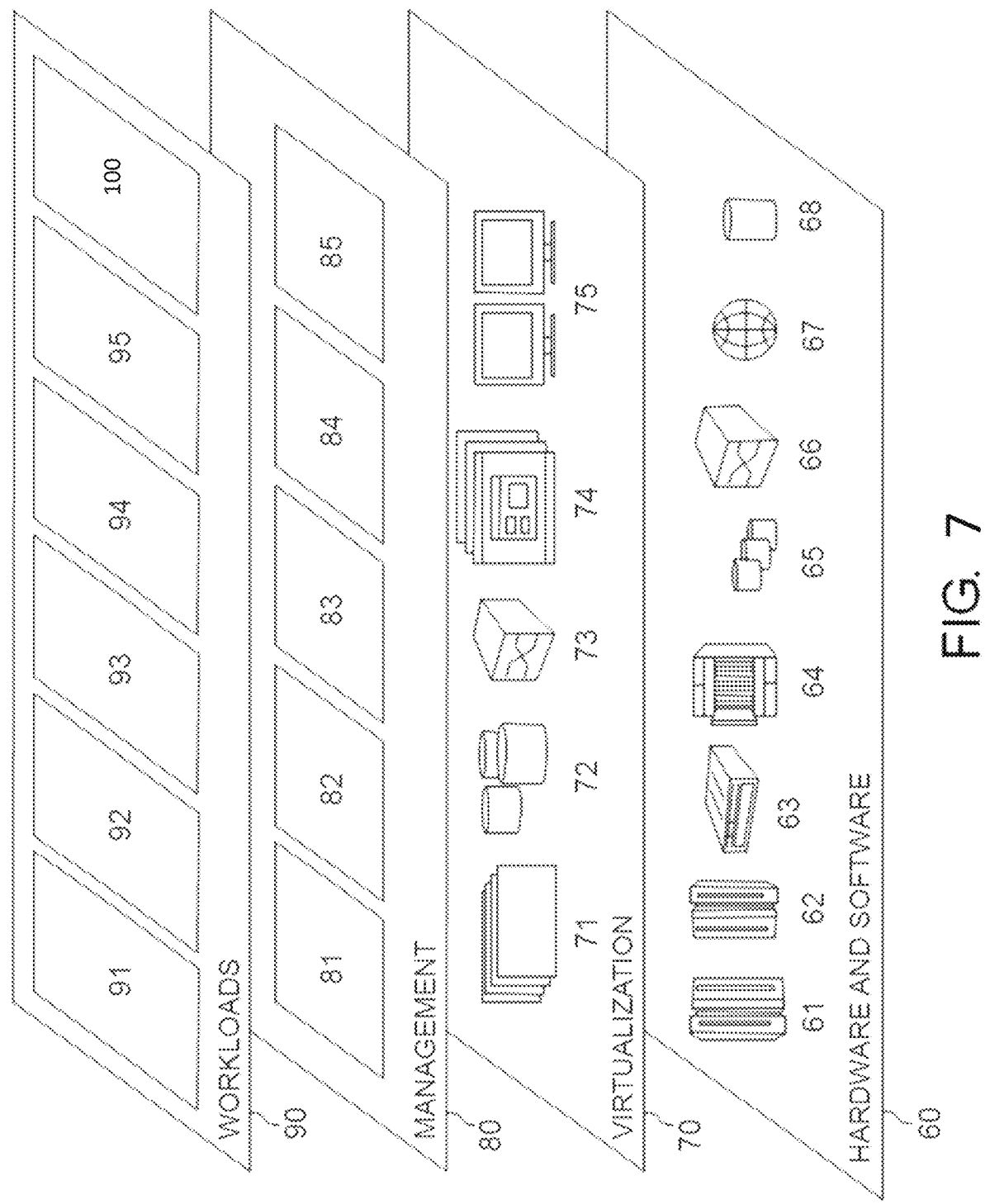
FIG. 7 depicts abstraction model layers according to an embodiment of the present invention.

Referring now to FIG. 7, an exemplary set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and concept discovery method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented concept discovery method, the method comprising:

preparing a concept index for concepts built over a set of input data comprising structured data having input terms, the preparing being based on a payment and performing a minimal curation by a lightweight mapping of known entities and linking the known entities using a Uniform Resource Indicator (URI) until a cost of a running of the minimal curation meets the payment;

building a vector representation of the concepts in the input data where every value in the input data is transformed into an embedding vector by a virtual document creation process that turns each row in the structured data into a context in a corpus of text wherein values in different columns in structured data describe a different feature;

receiving a set of query terms as an additional input;

mapping the set of query terms to the concepts in the concept index;

calculating:

a co-occurrence score for each of the concepts in the concept index by measuring their frequency of co-occurrence with the input terms' concepts, the calculation relying on an efficient index to measure a level of co-occurrence of concepts in a collection of events in the structured data and uses this as a measure of relevance; and a similarity score for each of the concepts in the concept index by measuring the similarity of their vector representations according to a vector similarity measure that uses the values in the different columns in the structure data; and ranking the concepts with respect to their relevance to the input terms by a combination of the co-occurrence score and the similarity score, wherein the set of input data is prepared by a common ingestion pipeline operating on a cluster in a cloud node, without interaction with an existing database, for both event databases and knowledge sources and the common ingestion pipeline crawls remote sources, cleaning invalid records and applying filters, and then storing a result as the concept index.

2. The computer-implemented method of claim 1, wherein the input data comprises event databases and knowledge bases.

3. The computer-implemented method of claim 1, further comprising:
receiving a natural language question as a further input; and
extracting query terms from the question.

4. The computer-implemented method of claim 1, further comprising:
receiving at least one of an image and a video as a further input; and
extracting query terms using at least one of optical character recognition (OCR), speech recognition, examination of captions, and machine recognition of objects and people.

5. The computer-implemented method of claim 1, further comprising measuring a relatedness of the concept index to the query terms.

6. The computer-implemented method of claim 1, embodied in a cloud-computing environment.

7. A computer program product for concept discovery, the computer program product comprising a computer-readable storage medium having program instructions embodied therewith, the program instructions executable by a computer to cause the computer to perform:
preparing a concept index for concepts built over a set of input data comprising structured data having input terms, the preparing being based on a payment and performing a minimal curation by a lightweight mapping of known entities and linking the known entities using a Uniform Resource Indicator (URI) until a cost of a running of the minimal curation meets the payment;
building a vector representation of the concepts in the input data where every value in the input data is transformed into an embedding vector by a virtual document creation process that turns each row in the structured data into a context in a corpus of text wherein values in different columns in structured data describe a different feature;
receiving a set of query terms as an additional input;
mapping the set of query terms to the concepts in the concept index;
calculating:
a co-occurrence score for each of the concepts in the concept index by measuring their frequency of co-occurrence with the input terms' concepts, the calculation relying on an efficient index to measure a level of co-occurrence of concepts in a collection of events in the structured data and uses this as a measure of relevance; and a similarity score for each of the concepts in the concept index by measuring the similarity of their vector representations according to a vector similarity measure that uses the values in the different columns in the structure data; and ranking the concepts with respect to their relevance to the input terms by a combination of the co-occurrence score and the similarity score, wherein the set of input data is prepared by a common ingestion pipeline operating on a cluster in a cloud node, without interaction with an existing database, for both event databases and knowledge sources and the common ingestion pipeline crawls remote sources, cleaning invalid records and applying filters, and then storing a result as the concept index.

8. The computer program product of claim 7, wherein the input data comprises event databases and knowledge bases.

9. The computer program product of claim 7, further comprising:
receiving a natural language question as a further input; and
extracting query terms from the question.

10. The computer program product of claim 7, further comprising:
receiving at least one of an image and a video as a further input; and
extracting query terms using at least one of optical character recognition (OCR), speech recognition, examination of captions, and machine recognition of objects and people.

11. The computer program product of claim 7, further comprising measuring a relatedness of the concept index to the query terms.

12. A concept discovery system through augmented reality, the system comprising:
a processor; and
a memory, the memory storing instructions to cause the processor to perform:
preparing a concept index for concepts built over a set of input data comprising structured data having input terms, the preparing being based on a payment and performing a minimal curation by a lightweight mapping of known entities and linking the known entities using a Uniform Resource Indicator (URI) until a cost of a running of the minimal curation meets the payment;
building a vector representation of the concepts in the input data where every value in the input data is transformed into an embedding vector by a virtual document creation process that turns each row in the structured data into a context in a corpus of text wherein values in different columns in structured data describe a different feature;
receiving a set of query terms as an additional input;
mapping the set of query terms to the concepts in the concept index;
calculating:
a co-occurrence score for each of the concepts in the concept index by measuring their frequency of co-occurrence with the input terms' concepts, the calculation relying on an efficient index to measure a level of co-occurrence of concepts in a collection of events in the structured data and uses this as a measure of relevance; and a similarity score for each of the concepts in the concept index by measuring the similarity of their vector representations according to a vector similarity measure that uses the values in the different columns in the structure data; and ranking the concepts with respect to their relevance to the input terms by a combination of the co-occurrence score and the similarity score, wherein the set of input data is prepared by a common ingestion pipeline operating on a cluster in a cloud node, without interaction with an existing database, for both event databases and knowledge sources and the common ingestion pipeline crawls remote sources, cleaning invalid records and applying filters, and then storing a result as the concept index.

13. The system of claim 12, embodied in a cloud-computing environment.

* * * * *